United States Patent [19]

Möller et al.

[11] Patent Number: 4,562,884
[45] Date of Patent: Jan. 7, 1986

[54] HEAT-EXCHANGER ARRANGEMENT

[75] Inventors: Rolf Möller, Wangen; Gerhard Hirscher; Erich Bopp, both of Vogt, all of Fed. Rep. of Germany

[73] Assignee: Gebrüder Uhl, GmbH & Co. KG, Vogt, Fed. Rep. of Germany

[21] Appl. No.: 432,400

[22] Filed: Sep. 30, 1982

[30] Foreign Application Priority Data

Nov. 25, 1981 [DE] Fed. Rep. of Germany ....... 3146659

[51] Int. Cl.⁴ .............................. F28F 9/26; F24J 3/02
[52] U.S. Cl. ..................................... 165/76; 165/144; 165/174; 126/448
[58] Field of Search ............... 165/128, 129, 172, 178, 165/67, 68, 76, 130, 175, 144, 174; 126/448

[56] References Cited

U.S. PATENT DOCUMENTS

| | | | |
|---|---|---|---|
| 609,800 | 8/1898 | Fowler | 165/130 |
| 1,795,774 | 3/1931 | Hart | 165/130 |
| 1,797,636 | 3/1931 | Butler | 165/175 |
| 2,401,918 | 6/1946 | Elder et al. | 165/129 |
| 4,034,802 | 7/1977 | Schwarz | 165/129 X |
| 4,038,970 | 8/1977 | D'Ascoli et al. | 165/144 X |
| 4,136,856 | 1/1979 | Murdock | 256/24 |
| 4,155,346 | 5/1979 | Aresty | 165/76 X |
| 4,164,933 | 8/1979 | Alosi | 126/447 |
| 4,165,036 | 8/1979 | Meckler | 62/238 X |
| 4,278,076 | 7/1981 | Hopper | 126/450 |
| 4,484,622 | 11/1984 | Satchwell | 165/175 X |

FOREIGN PATENT DOCUMENTS

| | | |
|---|---|---|
| 42579 | 6/1981 | European Pat. Off. . |
| 36192 | 9/1981 | European Pat. Off. . |
| 80208 | 6/1983 | European Pat. Off. ............ 126/448 |
| 2012519 | 10/1971 | Fed. Rep. of Germany . |
| 2449277 | 4/1975 | Fed. Rep. of Germany . |
| 2729829 | 1/1978 | Fed. Rep. of Germany . |
| 7920698 | 10/1979 | Fed. Rep. of Germany . |
| 7915424 | 11/1979 | Fed. Rep. of Germany . |
| 2827986 | 1/1980 | Fed. Rep. of Germany . |
| 2850588 | 6/1980 | Fed. Rep. of Germany . |
| 2922849 | 12/1980 | Fed. Rep. of Germany . |
| 3013986 | 10/1981 | Fed. Rep. of Germany . |
| 3010523 | 10/1981 | Fed. Rep. of Germany . |
| 3008126 | 11/1981 | Fed. Rep. of Germany . |
| 3039062 | 11/1981 | Fed. Rep. of Germany . |
| 3023250 | 1/1982 | Fed. Rep. of Germany . |
| 3106253 | 9/1982 | Fed. Rep. of Germany . |
| 801452 | 8/1936 | France ................................. 165/130 |
| 601759 | 7/1978 | Switzerland ........................ 165/129 |
| 17084 | of 1898 | United Kingdom ................ 165/130 |
| 657692 | 9/1951 | United Kingdom ................ 165/130 |

Primary Examiner—Sheldon J. Richter
Attorney, Agent, or Firm—Michael J. Striker

[57] ABSTRACT

An arrangement for exchanging heat between the environment and a heat-transfer fluid, especially a solar heat absorber, includes a plurality of heat exchange elements which are provided with external fins and have internal flow-through passages for the fluid. The heat exchange elements are mounted on and the passages thereof communicate with internal channels of collector pipes. The collector pipes are, in turn, connected by respective corner members to connecting pipes to form a frame therewith. Such a frame, together with the heat exchange elements mounted therein, constitutes a heat-exchanger unit. A plurality of such heat-exchanger units can be arranged next to one another and/or above another in substantially vertical positions, to form an energy fence or a protective wall with heat-exchange capability. Then, the connecting pipes of the individual heat-exchanger units are connected to one another to establish a continuous flow pattern of the heat-transfer fluid through the arrangement. In the protective wall, the heat-exchange elements themselves may provide noise dampening or view obstruction, or additional perforated or noise-absorbing layers may be provided for this purpose.

45 Claims, 9 Drawing Figures

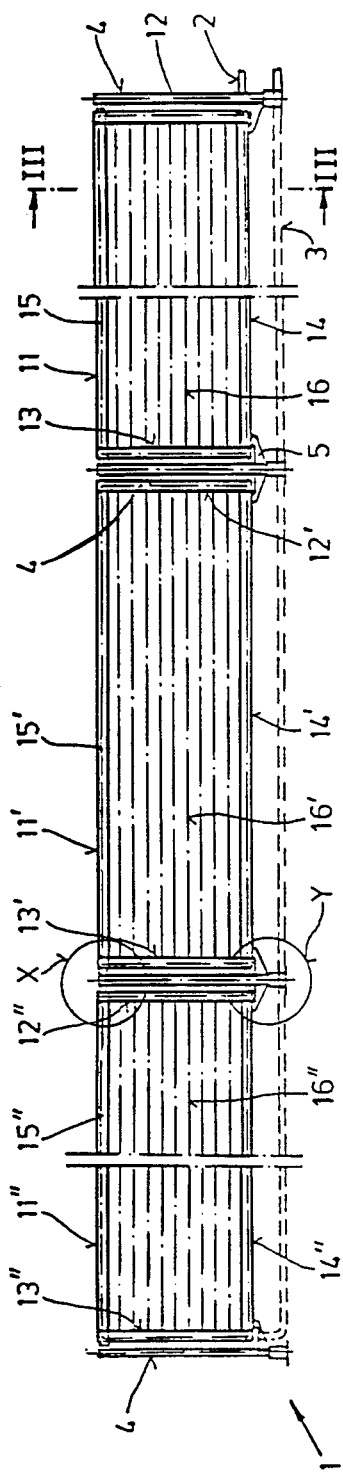
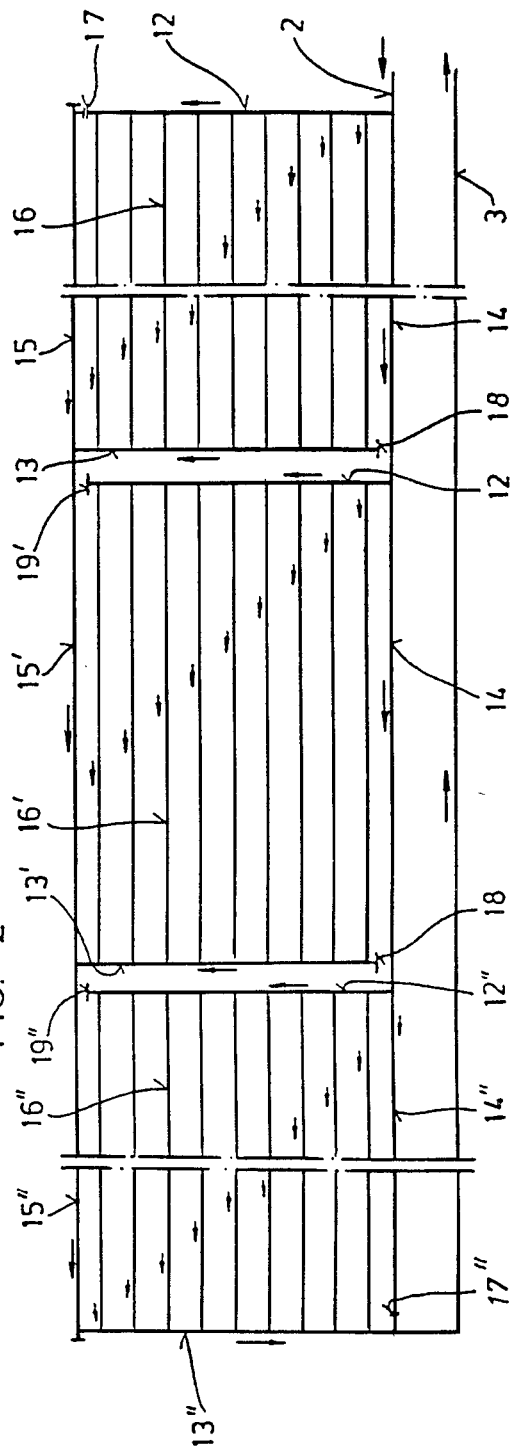
FIG. 1
FIG. 2

HEAT-EXCHANGER ARRANGEMENT

BACKGROUND OF THE INVENTION

The present invention relates to heat-exchanger arrangements in general, and more particularly to heat-exchanger arrangements capable of accomplishing heat transfer between a fluid flowing therethrough and the environment, that is, the ambient atmosphere and/or solar heat beams.

There are already known various heat-exchanger arrangements which accomplish transfer of heat between two flowable media, or which are capable of utilizing solar energy for warming up a fluid flowing through the heat-exchanger arrangement. Such conventional heat-exchanger arrangements usually include a plurality of heat exchange elements or tubes which are preferably provided with external fins to increase the effective heat-exchange area thereof. Such heat exchange elements are provided with at least one internal passage each for the flow of the heat-transfer fluid, that is, the fluid which is circulating in a closed circuit including a user for such a fluid, therethrough. The passages of the heat exchange elements are connected, at their respective ends, with collector pipes for the supply of the heat-transfer fluid into the passages, and for the discharge of the fluid from the passages into the same, respectively.

A heat-exchanger arrangement of this type is known, for instance, from the German petty patent DE-GM No. 80 07 436. In this conventional construction, the collector pipes are provided with longitudinally extending insertion channels, into which there are inserted holding bars that are connected with the heat exchange elements. When the heat-exchanger arrangement is constructed in this manner, it is achieved that the heat exchange elements can be connected to the collector pipes at any arbitrarily selected locations; however, the construction of the connections as well as the mounting of each of the heat-exchange elements on the respective collector pipe involve relatively high costs in terms of material and labor. However, an even more pronounced disadvantage of this conventional construction is that optimum flow conditions cannot be achieved, especially when a plurality of heat-exchanger arrangements or units of this type is connected to one another such that the heat-transfer fluid flows therethrough in succession. This is attributable to the fact that the two collector pipes of the arrangement do not permit a compensation for the pressure differences via corresponding pipe ducts, so that additional pipe conduits are indispensable.

SUMMARY OF THE INVENTION

Accordingly, it is a general object of the present invention to avoid the disadvantages of the prior art.

More particularly, it is an object of the invention to provide a heat-exchanger arrangement of the type here under consideration which does not possess the disadvantages of the conventional arrangements of this type.

Still another object of the invention is to so construct the arrangement of the above type as to facilitate and simplify the mounting of the heat exchange elements.

It is yet another object of the present invention to so design the arrangement of the above type as to achieve optimum flow conditions of the heat-transfer fluid therethrough, especially when a plurality of heat-exchanger units in accordance with the present invention are arranged downstream of one another.

A concomitant object of the present invention is to develop a heat-exchanger arrangement of the above type which is inexpensive to manufacture, easy to install and use, simple in construction, and nevertheless reliable in operation.

In pursuance of these objects and others which will become apparent hereafter, one feature of the present invention resides in an arrangement for exchanging heat between the environment and a heat-transfer fluid, such as a special energy absorber using energy from air, rain, condensation as well as solar radiation, especially a solar heat absorber, which comprises at least one heat-exchanger unit including at least one hollow elongated heat exchange element having two end portions and bounding at least one passage for the heat-transfer fluid extending longitudinally of the element and having two open ends at the respective end portions of the element, a pair of collector pipes each so connected to one of the end portions of the element as to extend substantially transversely of the latter and beyond the same to each side of the element and each bounding a collecting channel communicating with the respective open end of the passage for respectively supplying the heat-transfer fluid to the passage and receiving the heat-transfer fluid from the passage, a pair of connecting pipes, and means for so securing the connecting pipes to to the collector pipes as to form a fluid-tight self-supporting frame therewith, such securing means including respective corner parts rigid with the respective connecting and collector pipes; and means for causing the fluid to flow through the heat-exchanger unit. Advantageously, the connecting pipes have substantially the same cross-sectional configuration as the collector pipes It is further advantageous when the corner parts are constructed as corner members separate from and sealingly mounted on the respective collector and connecting pipes. Another advantageous feature of the invention can be found in the fact that the heat exchange element is provided on its exterior with a plurality of fins which increase the heat exchange area of the heat exchange element In most cases, it will be advantageous to equip the heat-exchanger unit with a plurality of heat exchange elements of the above-discussed type, such heat exchange elements then extending parallel to one another within the frame between the collector pipes.

According to another advantageous feature of the present invention, the passages of the heat exchange elements are so connected to the collecting channels of the collector pipes that the sum of the input to and output from the respective passage is substantially the same for all of the heat exchange elements.

To achieve advantageous flow conditions of the heat-transfer fluid as the same flows through a plurality of the heat-exchanger units constituting the heat-exchange arrangement, it is advantageous to provide the collector pipe for the supply of the fluid of a first one of the heat-exchanger units with a throttling member, and the collector pipe of the following heat-exchanger units with respective closing caps which are respectively arranged ahead of the connection to the connecting pipe. In addition thereto, the collector pipe for the discharge of the fluid is to be provided, according to the present invention, with a closing cap situated between the connection to one of the connecting pipes and the first flow-through passage of the heat exchange element.

However, the flow pattern through the consecutive heat-exchanger units may also be different, in accordance with another aspect of the present invention, in that the passages of the heat exchange elements are so connected to the respective collector pipes that the supply path and the discharge path of the passages in the channels of the collector pipes is always the same for the respective passage of the heat exchange element. A heat-exchanger unit utilizing this flow pattern is advantageously being used as the last heat-exchanger unit of the arrangement.

When a plurality of the heat-exchanger units is being used, it is further advantageous to provide the end of the collector pipe for the supply of the fluid of the last heat-exchanger unit, ahead of the connection to the connecting pipe secured thereto, with a closing cap.

In an advantageous manner, a plurality of the heat-exchanger units equipped with the heat exchange elements can be connected to one another to form an energy-absorbing fence. In this construction, the connecting pipes of the second and of the following heat-exchanger units are connected as supply conduits for the respectively succeeding heat-exchanger units and as discharge conduits for the respectively preceding heat-exchanger units.

The frame which is constituted by the collector pipes and by the connecting pipes can be constructed, in a simple manner, as a rectangular, self-supporting frame, in which the heat exchange elements extend substantially parallel to the connecting pipes between the collector pipes, being oriented either horizontally or vertically when the heat-exchanger unit assumes its substantially vertical erected position.

In order to increase the total heat-exchange area of the heat-exchanger unit, even the collector and the connecting pipes are advantageously provided with projecting fins or ribs at their exteriors. Advantageously, the pipes are provided with a pair of fins of substantially U-shaped cross sections which extend parallel to one another and which are open toward the heat exchange elements connected thereto.

To achieve connection of the heat exchange elements to the respective collector pipes, a longitudinally extending planar abutment surface, which advantageously extends substantially parallel to the respective fin, may be formed thereon, this planar abutment surface being delimited on both of its sides by angularly configurated ribs, which preferably are continuous. For the fluid-tight connection of the passages of the heat exchanger elements to the collector pipes, there can be provided, in each instance, a connecting member which is insertable into the same and sealingly engaging the abutment surfaces of the latter, the connecting member having a pressing flange that is introducible into the groove formed by the angular ribs and engages behind the angular ribs. The pressing flange is advantageously provided with protuberances projecting therefrom in the direction toward the fins of the heat exchange elements which engage between such fins for preventing the respective connecting members from turning.

In this context, it is advantageous when the heat exchange elements are held on the connecting members, which extend into the passages thereof, for axial movement relative thereto, and to insert cross-sectionally O-shaped sealing rings into the connecting members to seal the interface between the same and the heat exchange elements. In this manner, any changes in the lengths of the heat exchange elements can be easily compensated for.

Additionally, the heat exchange elements are to be so connected to the collector pipes, in accordance with the present invention, that relative turning or angular displacement therebetween is prevented. This is accomplished in a simple manner in that the fins of the heat exchange elements engage in the cross-sectionally U-shaped fins formed on the collector pipes and contact the same at their ends, which are advantageously angularly bent.

In accordance with another advantageous facet of the present invention, the corner parts or members are constructed as symmetric angular parts provided with connecting nipples. A connecting portion for the connection of two frames or for the connection of supply or discharge conduits is formed on one of the outer sides of the respective corner member, this connecting portion extending in the axial direction of one of the connecting nipples.

In addition thereto, the connecting pipes and/or the collector pipes are to be positively connected with the corner members. This connection can be accomplished by using pins passing through the same, by means of keys, by means of threaded connections or the like. It is advantageous when the corner elements or members are provided, at the free ends of the connecting nipples, with a reduced cross sectional diameter portion which is provided with an annular groove. Disc-shaped throttling members or closing caps can then be mounted on the reduced-diameter portions, such components being substantially C-shaped in cross section. In addition thereto, the corner parts or members can be connected fluid tight to the collector pipes, the connecting pipes, and/or to the supply and discharge conduits for the heat-transfer fluid, the interfaces at these regions being sealed by means of O-rings received in the corner members and more particularly in their connecting nipples.

When the arrangement is constructed as a fence including a plurality of the above described heat-exchanger units, it is further advantageous to support the lowermost pipes of the heat-exchanger units respectively on a bracket which is held on a carrier member and which laterally embraces the respective pipes. The bracket is preferably mounted on the carrier member for adjustment of the elevation thereof. In this connection, it is also advantageous to laterally hold the heat-exchanger units on the respective carrier member by means a guiding plates which confine the respectively uppermost one of the connecting or corner members between themselves in the lateral directions of the carrier member. Furthermore, it is proposed by the present invention to interpose into the connecting conduit between the two frames that neighbor one another a length-compensating element, which is sealingly connected with the connecting portions of the respective corner members of the two neighboring frames. Moreover, the intermediate spaces between the neighboring frames are to be covered by means of a generally cross-sectionally U-shaped covering member which is positioned on the top one pipe of each of the neighboring frames from above and which is secured to the latter, either by resorting to snap action, or by using threaded connectors.

The arrangement for exchanging heat constructed in accordance with the present invention, as described above, not only is simple as far as its construction is concerned and thus economical to manufacture, but it also achieves optimum flow conditions for the heat-transfer fluid and, consequently, optimum heat conveyance and transfer. More particulrly, when the collector pipes are assembled with the connecting pipes to form the closed frame, in which the heat transfer or heat exchange elements are held, it is possible without any additional measures to so connect the individual heat exchange elements to the collector pipes that the flow resistances of the respective individual fluid flow paths are approximately equal and the flow pattern and, consequently, the heat transfer are equally good at all regions.

The structural expenditure needed for manufacturing this heat exchange arrangement is relatively low, especially since, as opposed to the conventional arrangements of this type, no external conduits with branches are needed any longer. Moreover, the installation of the pipe conduits can be easily accomplished. So, for instance, when a plurality of the heat-exchanger units of the above-discussed type is to be erected and interconnected to form a fence or a similar structure, it is merely necessary, to establish the flow of the heat-transfer fluid through the structure or arrangement, to connect the frames of the adjacent or neighboring units with one another in succession by means of respective length-compensating elements, and to connect the supply and discharge conduits or hoses to the respectively first and last of the heat exchange units of the structure.

The mounting of the heat exchange elements on the collector pipes is accomplished by means of the connecting elements, without requiring the use of any screws or similar threaded connectors. Despite this, the heat exchange elements are so mounted as to be prevented from turning, and the various changes in lengths are easily compensated for. Thus, the installation or disconnecting of each of the heat-exchanger units and the connection thereof with adjacent heat-exchanger units can be easily accomplished.

According to a further concept of the present invention, there is provided a noise-reducing or view-obstructing fence or similar structure, which is usable, with only a minimum additional expense, also for heat transfer between the environment and the heat-transfer fluid, so that the cost-to-utility ratio is considerably improved as compared to conventional arrangements of this type, and better than before possibilities of use are obtained.

In accordance with the present invention, this is accomplished in that the protective wall of the above type is constituted, for heat transfer purposes, by a single absorber component or by a plurality of such absorber components which are arranged next to one another or above one another, or that one of both of the major surfaces of a simple or of a multi-part protective wall is constructed as an absorber component.

In this connection, it is advantageous when the absorber component consists of a plurality of profiled elements provided with fins, which are arranged next to one another or above each other in the erected wall, these elements having internal passages which are connected by respective pipes or conduits with one another and/or with a heating or cooling circuitry.

The protective wall which is provided with the absorber components, in which the fins of the profiled elements advantageously overlap one another, can advantageously consist of stackable components which are arranged next to another or one above one another. In this context, it is advantageous when each of such components includes a preferably metallic outer frame whose upper and lower portions are complementarily provided with substantially cross-sectionally V-shaped projections or ridges and recesses or grooves which fit into one another so as to align the components with one another in the wall. In other words, the ridge has a configuration resembling that of the saddle roof, and the groove is shaped complementarily thereto. It is also advantageous when the upper portion of the outer frame is provided, at one or both of its sides, with a protrudring projecting portion which serves to cover or conceal the heat exchange elements and/or the collector pipes at selected regions thereof.

In order to break the sound waves, the protective wall can be equipped, or the individual absorber component may be provided, at its major surface facing toward the source of the sound or noise with a perforated, essentially plate-shaped formation. Moreover, at least one layer of sound-dampening or sound-absorbing material may be provided between the perforated formation and the remainder of the protective wall.

When the noise or observation preventing wall is constructed in the above-discussed manner in accordance with the invention, then it serves not only for the noise suppression, but also simultaneously for the acceptance or dissipation of heat energy. As a result of the construction of the protective wall as a heat absorber element or as a combination of heat absorber components, it is possible to achieve, at a minimum expense, and especially without having to build additional structures which are usually disturbing, installation of absorbers in a simple manner, and to utilize the thermal energy reclaimed by the latter, for instance, for heating purposes. In this connection, it is also advantageous that noise preventing or suppressing or view obstructing protective walls are almost always erected in populated areas and that the temperature level in the immediate vicinity of roadways is always somewhat higher than in open spaces. The absorption of the sound waves impinging on the absorber components further contributes to the increase of the temperature of the fluid flowing through the latter. Therefore, the expense for the installation of the various conduits remains within the acceptable range.

Thus, by resorting to the construction according to the present invention, there is obtained an arrangement by means of which there is obtained, at only a small additional expenditure, an effective protection against undesirable sound or noise. The presence of the absorber components results in additional breaking of the sound waves and, in addition thereto, the available thermal energy is utilized. Therefore, the cost-to-utility ratio of such a combination is considerably higher than in a separate installation, especially since substantial material and cost savings result from the combination of the absorber components with the protective wall.

The novel features which are considered as characteristic of the invention are set forth in particular in the appended claims. The improved heat exchange arrangement itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a side elevational view of an energy-absorbing fence according to the present invention;

FIG. 2 is a view of the flow pattern of FIG. 1;

DETAILED DESCRIPTION OF THE PREFERRED EMBODIMENTS

Figure 3:
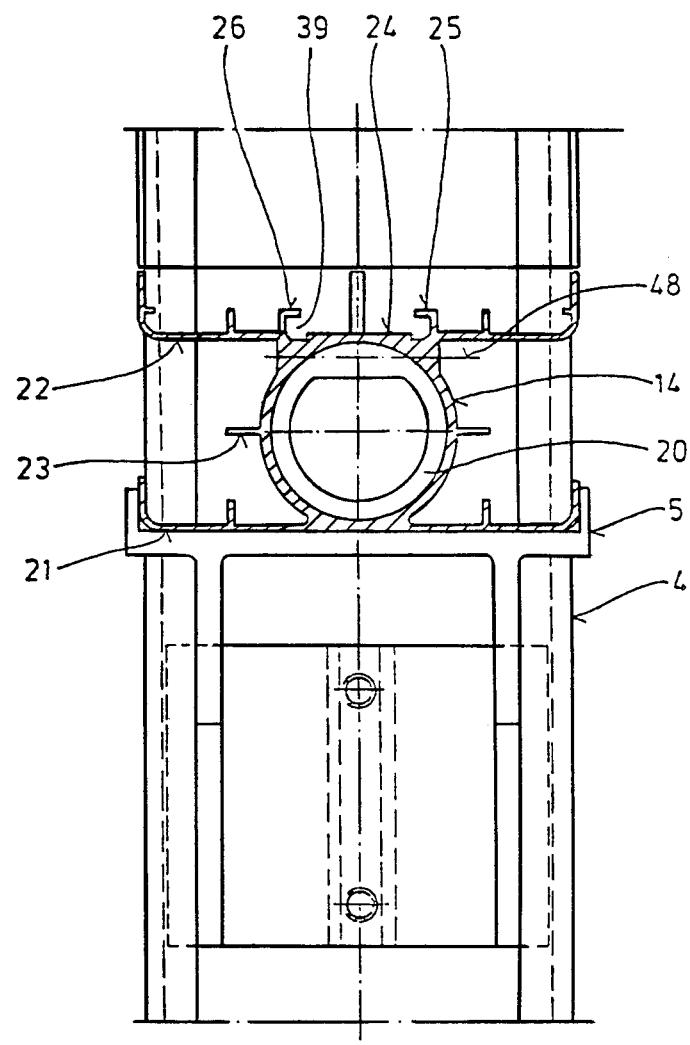
FIG. 3 is a section taken on line III—III of FIG. 1.

Referring now to the drawing in detail, and first to FIG. 1 thereof, it may be seen that the reference numeral 1 has been used therein to identify an energy fence or heat-exchanger fence according to the present invention. As illustrated, the fence or heat exchange arrangement 1 includes three heat-exchanger units which are arranged consecutively and which are operative for accomplishing heat transfer between the atmosphere (including possible radiation, such as solar heat) and a heat-transfer fluid circulating through the interior thereof. Of course, it will be appreciated that the arrangement 1 may have any desired length, that is, any desired number of the individual heat-exchanger units, as may be necessary or desirable. The corresponding parts of the units shown in the drawing are identified with the same reference numerals without a prime for a first one of the units, with a single prime for the second unit, and with a double prime for the third or last unit.

The respective heat-exchanger units include substantially rectangular frames 11, 11' and 11" which carry respective heat exchange elements 16, 16' and 16". The frames 11, 11' and 11" essentially consist of respective supply collector pipes 12, 12' and 12" for the supply of the heat-transfer fluid, respective discharge collector pipes 13, 13' and 13" for the discharge of the heat-transfer fluid, respective upper and lower connecting pipes 14, 14' and 14" and 15, 15' and 15", as well as corner connecting parts or members 20, which can be seen in FIG. 3 which interconnect the respective connecting pipes 14, 14' and 14" and 15, 15' and 15" with the associated collector pipes 12, 12' and 12" and 13, 13' and 13", in a fluid-tight sealed manner. The frames 11, 11' and 11" which are made self-supporting in the above discussed manner are held on supports or carrier members 4, as shown in FIG. 1. For this purpose, there are provided brackets 5 which are so mounted on the respective carrier members 4 as to be adjustable in elevation from the ground and as to be arrestable in the selected elevated positions, and which partially receive the lower connecting members 14, 14' and 14" of the frames 11, 11' and 11", as well as guide plates 6 which laterally support the respective corner members 20 which are connected to the upper connecting pipes 15, 15' and 15" thus confine the same between themselves.

A throttling member is provided in the collector pipe 12 for the supply of the fluid of a first heat-exchanger unit and following heat-exchanger units are provided with closing caps 19 arranged in the collector pipes ahead of the connection with the connecting pipe, thereby allowing optimal flow conditions. In addition to the above closing caps, another cap 18 is provided in the collector pipe for discharge of the fluid.

As may be seen particularly in FIG. 3, the inwardly facing side of the collector pipes 12 and 13 (and similarly, without further description, also that of the collector pipes 12' and 12", and 13' and 13") is provided with a planar abutment surface 24. The planar surface 24 is delimited by two angularly configured ribs or webs 25 and 26, which thus form a receiving groove 39. The heat exchange elements 16, each of which includes a duct 31 bounding an internal passage, and a plurality of fins 32, 33, 34, 35 and 36 externally formed on the duct 31, can be easily mounted by means of respective connecting members 27 which are inserted into respective bores of the respective collector pipes 12 and 13. More particularly, each of the connecting members 27 is provided with a pressing flange 28 which can be threaded into the receiving groove 39. A fluid-tight sealed connection is then formed by means of a seal 38 which contacts the abutment surface 24, as well as by means of O-ring seals 30 inserted in the connecting members 27.

Figure 6:
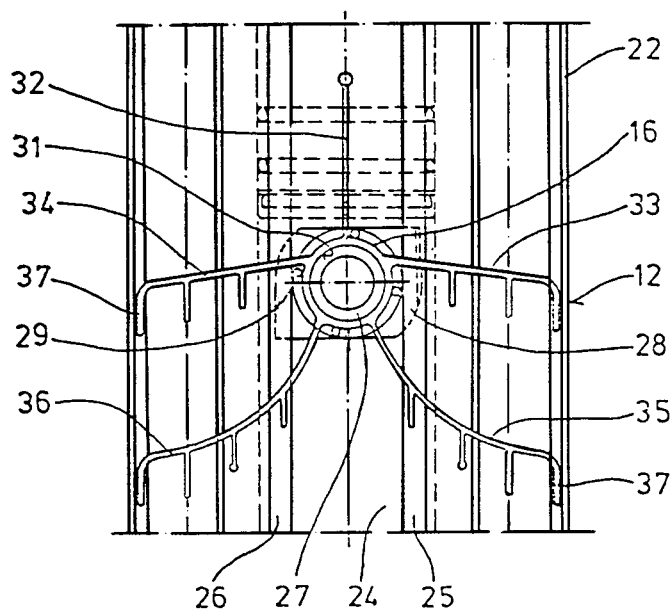
FIG. 6 is a cross-sectional view of a heat-exchange element of the arrangement of FIG. 1.
Figure 7:
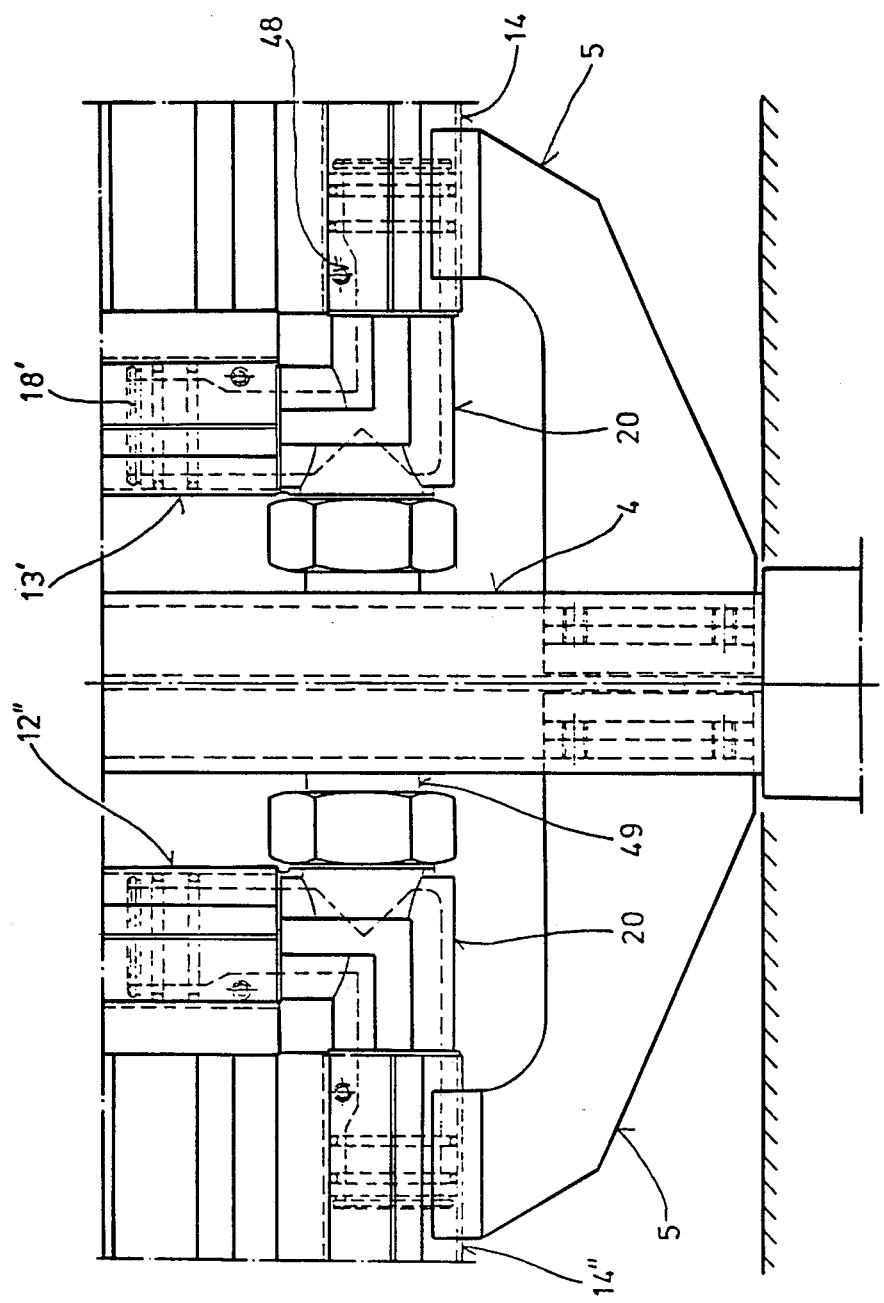
FIG. 7 is a partly sectioned view of a detail Y of FIG. 1, at a larger scale.

The pressing flange 28 is further provided with protrusions or bulges 29 which project toward the respective heat exchange element 16. As may be seen especially in FIG. 6, the protrusions or bulges 29 engage between the fins 32, 33, 34, 35 and 36 of the heat exchange element 16. In addition thereto, the fins 33, 34, 35 and 36 are provided at their ends with angularly extending webs 37 which engage between the U-shaped fins 22 of the respective collector pipes 12 and 13. As a result of this construction, the heat exchange elements 16 are so connected with the collector pipes 12 and 13 that relative turning or angular displacement thereof is prevented, and the connecting members 27 are connected with the heat exchange elements 16 in the same fashion. Thus, even though no threaded connections are being used for connecting the heat exchange elements 16 with the respective collector elements 12 and 13, there is nevertheless achieved a secure and rigid connection. Moreover, since the heat exchange elements are sealingly mounted on the connecting members 27, but with freedom of movement in the axial direction thereof, any length differences or variations can be easily compensated for.

Figure 4:
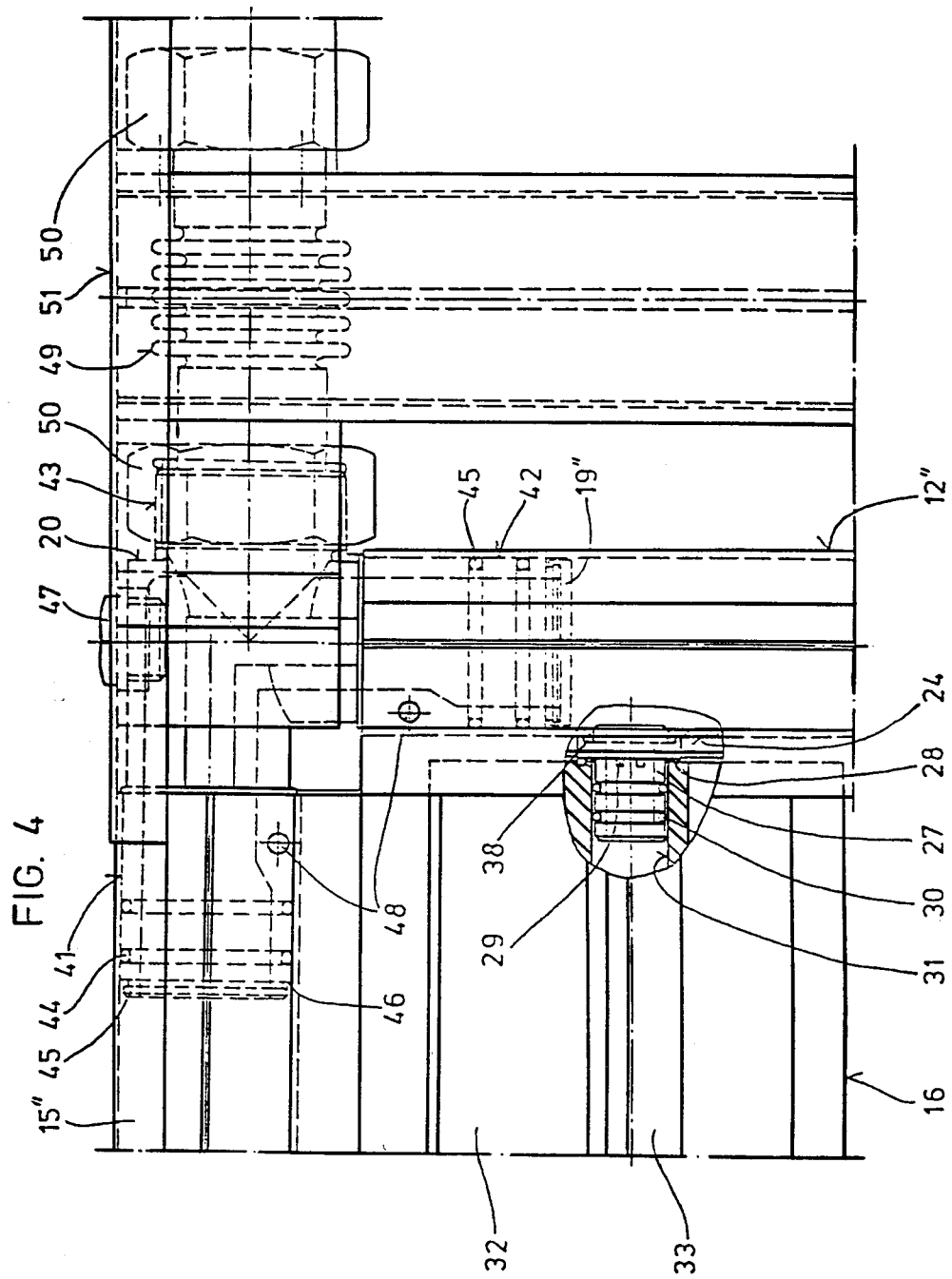
FIG. 4 is a partly sectioned view of a detail X of FIG. 1, at a larger scale.
Figure 5:
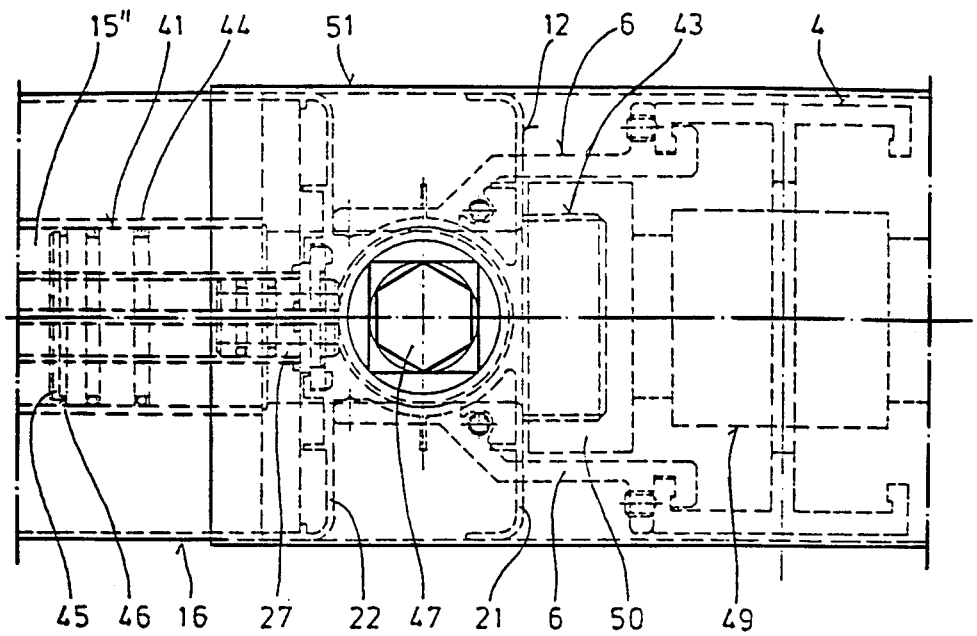
FIG. 5 is a top view of the detail X of FIG. 4.

The corner connectors or members 20, by means of which the collector pipes 12 and 13 are sealingly connected with the connecting pipes 14 and 15 to form the frame 11, are symmetrically constructed and each of them includes two connecting nipples 41 and 42 which, in each instance, extend into one of the collector pipes 12 and 13, and into one of the connecting pipes 14 and 15. The respective collector and connecting pipes 12, 13, 14 and 15 are secured to the respectively associated corner members 20 by means of pins 48. The connectors or corner members 20 are each further formed, at the ends of the respective connecting nipples 41 and 42, with a respective reduced-diameter portion 45 and with an annular groove 46, so that generally disc-shaped throttling members or closing cap members can be easily positioned thereon and arrested in their respective operative positions. The connecting nipples 41 and 42 are also provided, in their interiors, with O-ring seals 44. In addition, the corner connector 20 which is shown in FIG. 4 is provided with an air-bleeding plug 47.

For the connection of the individual frames 11, 11' and 11" to one another, or for the connection of supply or discharge conduits, the connecting corner members 20 are each provided, at a respective outer side, with a further connecting portion 43, to which there is connected, by means of a nut 50, a compensating element 49 or another conduit. The intermediate space between the respective adjacent frames 11 and 11' or 11' and 11" is covered by a covering member 51 which is positioned from above onto, and held by snap action in position on, the upper connecting pipes 14 and 14', and 14' and 14" of the respective frames 11, 11' and 11".

The installation of the frame 11, which constitutes an arrangement or unit for accomplishing heat exchange, together with the heat exchange elements 16, with the heat transfer medium flowing through the collector pipes 12 and 13, the connecting pipes 14 and 15, and the heat exchange element 16, is extremely simple, due to its construction, and can be accomplished in a short period of time. In addition thereto, a plurality of the frames 16, or of the above-discussed heat-exchanger units, can be connected into an energy fence or a similar structure, without encountering any difficulties, and at only a minimum additional expense. This energy fence then has optimum flow conditions and thus achieves an optimum heat exchange.

Figure 8:
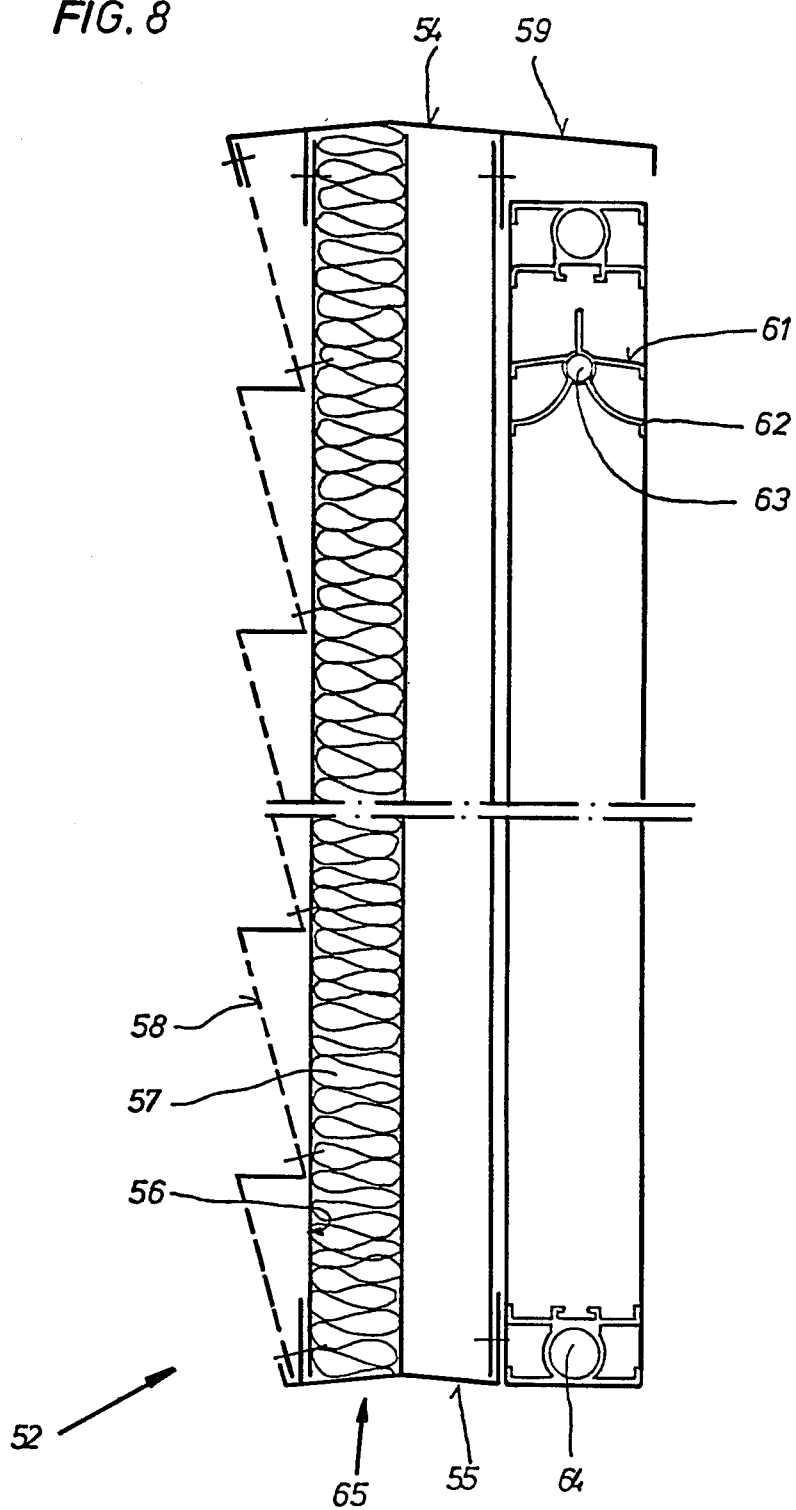
FIG. 8 is a vertical section through an element of a protective wall equipped with heat-exchange elements.

FIG. 8 illustrates a noise-reducing and/or view-obstructing protective wall 52 which constitutes individual stackable components 60. The components 60 are held, for instance, in cross-sectionally H-shaped vertically extending supports. Each of the components 60 includes an outer frame 65 on which there are mounted absorber elements 61 cabable of absorbing or dissipating thermal energy. The outer frame 65 includes two lateral portions 53, as well as an upper portion 54 and a lower portion 55. The upper and lower portions 54 and 55 of the outer frame 65 have cross sections which are complementary to one another, that is, they are provided with cross-sectionally substantially V-shaped or saddle roof shaped compatible longitudinally extending ridge and groove formations. This results in a situation where, when two or more of the components 60 are arranged above one another in the protective wall 52, they will become automatically centered or aligned with each other and will support each other even in the horizontal direction, due to the cooperation of the ridge and groove formations with one another. The lateral portions 53, as well as the upper and the lower portions 54 and 55, are rigidly connected to one another by means of a plate 56. Furthermore, noise-dampening material 57 is arranged within the outer frame 65. In order to break up the sound waves, a perforated formation 58 of a substantially plate-shaped construction, which may advantageously consist of a plurality of individual perforated metal sheets, is arranged at the outer major surface of the protective wall 52 which faces the source of the noise to be suppressed or screened.

Figure 9:
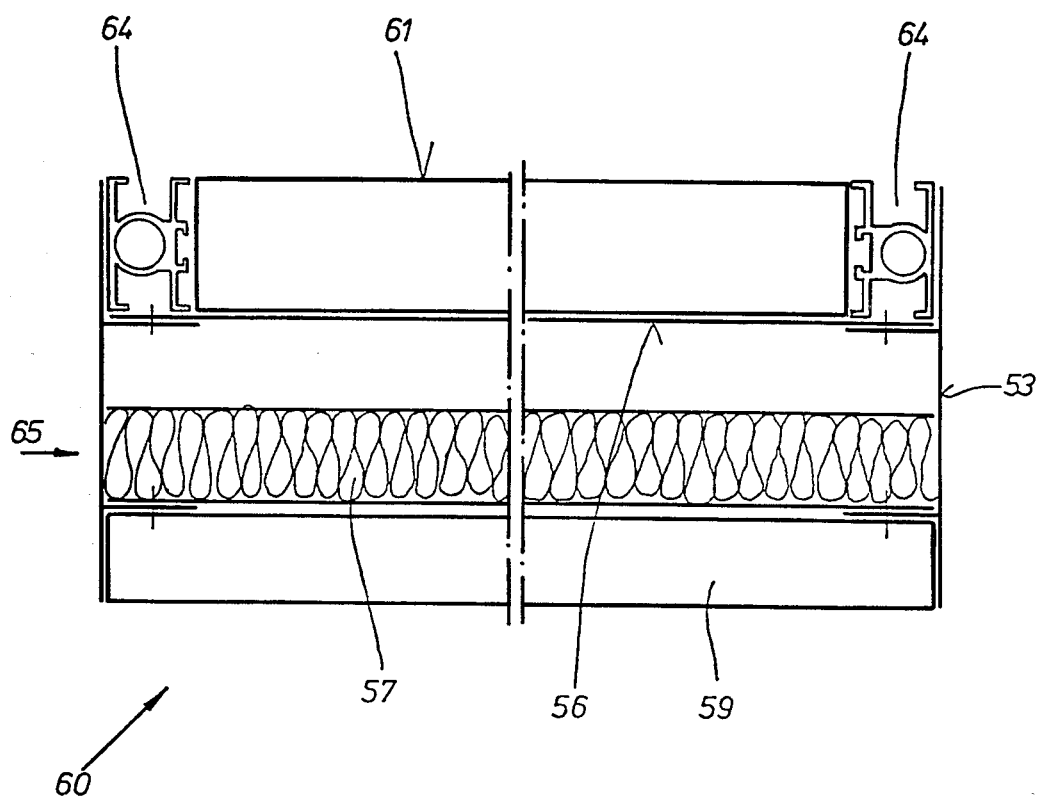
FIG. 9 is a top view of the element of FIG. 8.

The absorber elements 61 which are arranged at the outer major surface of the protective wall 52 include profiled fins 62 which are mounted on a central duct 63 having an internal passage for the flow of the heat-transfer medium or fluid therethrough. As may be seen especially in FIG. 9, there are further provided substantially vertically extending collector pipes 64, to which the ducts 63 are connected. The collector pipes 64, in turn, are connected to non-illustrated ground or underground conduits that are incorporated in a heat-conveying circuit. The thermal energy which is, for instance, received by the profiled fins 62 from the environment, is transferred by the fins 62 to the heat-transfer fluid which flows through the internal passages of the ducts 63 and through the internal channels of the collector pipes 64 and, in this manner, introduced into the heating or cooling circuitry.

It will be understood that each of the elements described above, or two or more together, may also find a useful application in other types of arrangements differing from the type described above.

While the invention has been illustrated and described as embodied in an energy fence or protective wall, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. An arrangement for exchanging heat between the environment and a heat-transfer fluid, especially a solar heat absorber, comprising: a plurality of heat-exchanger units, each unit including at least one hollow elongated heat exchange element having two end positions and bounding at least one passage for the fluid and extending longitudinally of said element and having two open ends at the respective end portions of said element, a pair of collector pipes each so connected to one of said end portions of said element as to extend substantially transversely of the latter and beyond the same at each side of said element and each bounding a collecting channel communicating with the respective open end of said passage for respectively supplying the fluid thereto and receiving the same therefrom, a pair of connecting pipes, and means for so securing said connecting pipes to said collector pipes as to form a fluid-tight self-supporting frame therewith, including respective corner parts which are rigid with the respective connecting and collector pipes; throttling members oriented in the supply collector pipe of a first heat-exchanger unit; closing caps located on one of said pair of collector pipes of following heat-exchanger units ahead of said securing means to said connecting pipe, said throttling members and closing caps acting to provide means for controlling flow conditions; and means for causing the fluid to flow through said heat-exchanger unit.

2. The arrangement as defined in claim 1, wherein said connecting pipes have substantially the same cross-sectional configuration as said collector pipes.

3. The arrangement as defined in claim 1, wherein said corner parts are constituted by corner members separate from and sealingly mounted on the respective collector and connecting pipes.

4. The arrangement as defined in claim 1, wherein each said element has an exterior provided with a plurality of fins for increasing its heat-exchange area.

5. The arrangement as defined in claim 1, wherein each said heat-exchanger unit includes at least one additional heat exchange element similar to said one heat exchange element and extending parallel to the latter between said collector pipes within said frame.

6. The arrangement as defined in claim 5, wherein said passages of said elements are so connected to said collecting channels of said collector pipes that the sum of the input to and the output from a respective passage is substantially equal for all of said elements.

7. The arrangement as defined in claim 5, wherein said plurality of heat-exchanger units are arranged downstream of each other as considered in the direction of flow of the fluid through the arrangement and said throttling member and said closing caps respectively arranged between one of said connecting pipes and said collector pipe for the supply of the fluid of respective units.

8. The arrangement as defined in claim 5; further comprising a closing cap arranged within one of said pair of collector pipes for receiving the fluid between the connection to said collector pipe to a first one of said connecting pipes and the closest one of said end portions of said passages communicating with said collector pipe.

9. The arrangement as defined in claim 5, wherein the collector pipes define a longitudinal supply path and a longitudinal discharge path, and the passage of said element is so connected to said collector pipes that the length of the supply path and the length of the discharge path defined in said collector pipes is always the same for a respective passage of a respective element.

10. The arrangement as defined in claim 9, wherein said plurality of heat-exchanger units include at least one additional heat-exchanger unit arranged downstream as considered in the direction of flow of the fluid through the arrangement; and a closing cap member arranged between that of said connecting pipes of said heat-exchanger unit which receives the fluid from the respective receiving channel of said heat-exchanger unit and the collector pipe of said additional heat-exchanger unit having the supply channel.

11. The arrangement as defined in claim 5, wherein said heat-exchanger units are arranged consecutively downstream of one another as considered in the direction of flow of the fluid through the arrangement, to form an energycollecting fence and said connecting pipes of said heat-exchanger units being respectively connected as supply conduits for a respective succeeding heat-exchanger unit an as receiving conduits for a respective preceding heat-exchanger unit.

12. The arrangement as defined in claim 5, wherein said frame is constructed as a rigid rectangular frame; and wherein said elements extend substantially parallel to said connecting pipes between said collector pipes.

13. The arrangement as defined in claim 5, wherein said connecting and collector pipes include external projections.

14. The arrangement as defined in claim 13, wherein said projections include longitudinally extending ribs.

15. The arrangement as defined in claim 13, wherein said projections include substantially plate-shaped fins.

16. The arrangement as defined in claim 15, wherein each of said collector and connecting pipes includes two of said plate-shaped fins, each of said fins having a substantially U-shaped cross section and being open toward the respective heat-exchanging elements.

17. The arrangement as defined in claim 16, wherein each of said collector pipes has a planar abutment surface extending longitudinally of the respective collector pipe.

18. The arrangement as defined in claim 17, wherein said planar abutment surface extends substantially parallel to one of said fins at the outer side of the respective collector pipe.

19. The arrangement as defined in claim 18, and further including protuberances on the respective collector pipes extending along said abutment surfaces at both sides thereof.

20. The arrangement as defined in claim 19, wherein said protuberances extend substantially over the entire length of the respective abutment surface.

21. The arrangement as defined in claim 19, wherein said protuberances have angular cross sections.

22. The arrangement as defined in claim 21, wherein said elements have external fins; and wherein said pressing flange has bulges which project therefrom toward said fins and engage between said fins for preventing said connecting member from turning.

23. The arrangement as defined in claim 21, wherein said angular protuberances delimit a recess; and further comprising means for fluid-tightly connecting said elements to said collector pipes, including a connecting member insertable into the respective collector pipe, sealingly abutting said abutment surface of the latter, and having a pressing flange introducible into said recess and engaging behind said protuberances.

24. The arrangement as defined in claim 23, wherein said elements are so mounted on said connecting members that the latter extend into said end portions of said passages for relative axial displacement; and further comprising O-shaped sealing rings interposed between said connecting members and said elements and operative for sealing the interface therebetween.

25. The arrangement as defined in claim 5, wherein said elements are so connected to said collector pipes as to prevent turning movement thereof.

26. The arrangement as defined in claim 5, wherein each of said collector pipes has at least one cross-sectionally substantially U-shaped fin formation which opens toward said heat exchanging elements; and wherein said heat exchanging elements have external fins at least some of which are received in said U-shaped fin formations and engage the same in a manner preventing turning of said heat exchanging elements.

27. The arrangement as defined in claim 26, wherein said some fins of said heat exchanging elements have angularly configurated end zones which engage said U-shaped fins of said collector pipes to prevent said turning.

28. The arrangement as defined in claim 1, wherein each of said corner parts is constructed as a symmetrical corner member separate from the respective collector and connecting pipes and including connecting nipples for connection to said collector and connecting pipes, and an additional connecting nipple extending from said corner member oppositely to and in alignment with one of said connecting nipples and serving for passage of the fluid therethrough into and out of said unit, respectively.

29. The arrangement as defined in claim 1, wherein said corner parts are constructed as corner members separate from and rigidly connected at least to one of the respectively adjacent ones of said collector and connecting pipes at the respective corner region each.

30. The arrangement as defined in claim 1, wherein said corner parts are constructed as corner members separate from said connecting and collector members and each having a plurality of connecting nipples; and wherein at least one of said connecting nipples of each of said corner members has a reduced-diameter end portion having an annular groove; and further comprising cross-sectionally substantially C-shaped closing cap discs and throtting discs which are mounted on said reduced-diameter end portions of said nipples of said corner members.

31. The arrangement as defined in claim 1, wherein said corner parts are constructed as corner members separate from said connecting and collector members and each having a plurality of connecting nipples at least some of which are connected to said connecting and collector pipes; and a plurality of O-ring seals arranged in said connecting nipples and sealing the interspaces between said nipples and the pipes respectively received therein.

32. The arrangement as defined in claim 1; and further comprising means for supporting each said unit in a substantially vertical position to form a part of an energy-absorbing fence, including at least one carrier member, and at least one bracket mounted on said carrier member and laterally embracing that of said pipes of said frame of said unit which is the lowest in said substantially vertical position to support said unit.

33. The arrangement as defined in claim 32, wherein said braket is mounted on said carrier member for adjustment of the elevation thereof.

34. An arrangement as defined in claim 32, and further comprising means for laterally holding said units, including a pair of guiding plates mounted on said carrier member and laterally confining that of said connecting parts which is situated at the top of said unit in said substantially vertical position between themselves.

35. The arrangement as defined in claim 1, wherein said plurality of heat-exchanger units are arranged downstream of one another as considered in the direction of flow of the fluid through the arrangement, and said corner parts of said heat-exchanger units have respective interconnecting nipples; and further comprising an interconnecting conduit interconnecting said interconnecting nipples of said heat-exchanger units with one another, and a lengthcompensating member interposed in said interconnecting conduit.

36. The arrangement as defined in claim 35, and further comprising means for covering the interspace between the adjacent ones of said heat-exchanger units, including a cross-sectionally substantially U-shaped covering member positioned from above over the top ones of said pipes of said adjacent heat-exchanger units as considered in said substantially vertical position and affixed to the same.

37. The arrangement as defined in claim 1; further comprising means for supporting said heat-exchanger units adjacent to one another in substantially vertical positions to form a continuous wall.

38. The arrangement as defined in claim 37, wherein each of said heat-exchanger units includes a plurality of said heat exchange elements which are arranged next to one another to form a substantially continuous surface of said wall.

39. The arrangement as defined in claim 38, wherein said heat exchange elements have fins which overlap one another to form said substantially continuous surface.

40. The arrangement as defined in claim 37, wherein said heat-exchanger units are constructed as stackable components for forming said continuous wall.

41. The arrangement as defined in claim 40, wherein said heat-exchanger units further include respective outer supporting frames having respective upper and lower portions having complementary substantially V-shaped projecting and recessed zones extending longitudinally thereof for centering said heat-exchanger units relative to one another when stacked above each other in said wall.

42. The arrangement as defined in claim 41, wherein said upper portions of said outer supporting frames have, at least on one side thereof, a projecting portion for covering a region of the respective heat-exchanger unit.

43. The arrangement as defined in claim 37, wherein said wall has at least on one of the major surfaces thereof at least one perforated plate-shaped formation.

44. The arrangement as defined in claim 43, wherein said wall further includes at least one layer of noise-dampening material between said perforated plate-shaped formation and said heat-exchanger unit.

45. The arrangement as defined in claim 37, wherein said wall further includes at least one layer of noise-dampening material at least on one of the major surfaces thereof.

* * * * *